United States Patent
Ziech et al.

(10) Patent No.: US 6,918,851 B2
(45) Date of Patent: Jul. 19, 2005

(54) CONCENTRIC SHIFT SYSTEM FOR ENGAGING AN INTERAXLE DIFFERENTIAL LOCK

(75) Inventors: James Ziech, Kalamazoo, MI (US); Lawrence P. Wagle, Fulton, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/288,686

(22) Filed: Nov. 6, 2002

(65) Prior Publication Data

US 2004/0087408 A1 May 6, 2004

(51) Int. Cl.⁷ ............................................. F16H 48/06
(52) U.S. Cl. ...................... 475/221; 475/205; 475/206; 475/235; 74/339; 192/85 A; 192/85 CA; 180/24.09; 180/248; 180/249; 92/165 PR
(58) Field of Search .................. 475/221, 205, 475/206, 235; 74/339; 192/85 A, 85 CA; 180/24.09, 248, 249; 92/165 PR (56) References Cited

U.S. PATENT DOCUMENTS

| | | | |
|---|---|---|---|
| 2,132,692 A | 10/1938 | Lawrence | |
| 3,146,842 A | 9/1964 | Nelson et al. | |
| 3,460,404 A | 8/1969 | Schmid | |
| 3,915,032 A | * 10/1975 | Ottemann | 472/231 |
| 3,916,278 A | 10/1975 | Currell et al. | 318/313 |
| 4,037,696 A | * 7/1977 | Shealy | 192/48.5 |
| 4,042,080 A | 8/1977 | Nelson | |
| 4,050,534 A | * 9/1977 | Nelson et al. | 180/24.09 |
| 4,194,586 A | * 3/1980 | Hicks | 180/24.09 |
| 4,263,824 A | 4/1981 | Mueller | |
| 4,432,431 A | * 2/1984 | Russell | 180/248 |
| 4,582,160 A | 4/1986 | Weismann et al. | 180/250 |
| 4,671,135 A | 6/1987 | Dangel | 74/694 |
| 4,715,248 A | 12/1987 | Gant | |
| 4,733,578 A | * 3/1988 | Glaze et al. | 475/246 |
| 5,099,944 A | 3/1992 | Kageyama et al. | 180/249 |
| 5,123,513 A | 6/1992 | Petrak | 192/85 CA |
| 5,176,591 A | 1/1993 | Krisher | 475/252 |
| 5,267,489 A | * 12/1993 | Ziech | 74/606 R |
| 5,273,499 A | 12/1993 | Friedl et al. | 475/241 |
| 5,299,986 A | 4/1994 | Fabris et al. | 475/88 |
| 5,320,586 A | * 6/1994 | Baxter, Jr. | 475/88 |
| 5,353,890 A | 10/1994 | Clohessy | 180/247 |
| 5,370,018 A | * 12/1994 | Kwasniewski | 74/606 R |
| 5,386,898 A | 2/1995 | Weilant et al. | 192/67 R |
| 5,503,602 A | * 4/1996 | Dick | 475/204 |
| 5,591,098 A | 1/1997 | Jones et al. | 475/231 |
| 5,860,889 A | * 1/1999 | Schlosser et al. | 475/221 |
| 6,368,072 B1 | * 4/2002 | Inoue et al. | 417/269 |
| 6,422,128 B1 | * 7/2002 | Ahn | 92/71 |
| 6,464,053 B1 | 10/2002 | Hoebrechts | |
| 6,467,592 B1 | * 10/2002 | Dernebo | 188/278 |
| 6,648,788 B1 | * 11/2003 | Sullivan | 475/221 |

FOREIGN PATENT DOCUMENTS

| | | | | |
|---|---|---|---|---|
| FR | 2789739 A1 | * | 8/2000 | F15B/15/14 |
| JP | 06081903 A | * | 3/1994 | F16H/1/12 |

* cited by examiner

*Primary Examiner*—Charles A. Marmor
*Assistant Examiner*—David D. Le
(74) *Attorney, Agent, or Firm*—Dykema Gossett PLLC (57) ABSTRACT

An interaxle differential is provided which includes a side gear, a clutch gear torsionally locked on a first input shaft and axially slidably mounted thereon and an annular piston mounted in a differential casing for urging the clutch gear into engagement with a side gear and a spring to urge the clutch gear to an unlocked position.

20 Claims, 6 Drawing Sheets

FIG. 11

CONCENTRIC SHIFT SYSTEM FOR ENGAGING AN INTERAXLE DIFFERENTIAL LOCK

FIELD OF THE INVENTION

The field of the present invention is that of interaxle differentials for vehicles having at least two powered axles. More particularly, the present invention relates to a torsional lock for locking the output shafts of a differential, especially differentials used in classes 7 and 8 large truck vehicles.

DISCUSSION OF RELATED ART

Differential gear mechanisms, commonly referred to as differentials, are well known devices which are frequently used in the drive train axle systems of most vehicles. The differential is usually connected between an input drive shaft (typically a drive shaft from the vehicle engine/transmission) and a pair of output shafts (typically a pair of axle half shafts connected to the vehicle wheels). The differential distributes torque from the input shaft equally to the two output half shafts, while permitting such output half shafts to rotate at different speeds under certain conditions. As a result, torque is supplied to both wheels of the vehicle as it negotiates a turn, while permitting the outside wheel to turn faster than the inside wheel.

Many tractors have a drive train which includes two drive axles wherein each drive axle includes two half shafts. Each half shaft is supported on a pair of double wheels and a differential is provided for each axle between the left and right half shafts. Between the pair of front and rear axle shafts, is a power dividing or interaxle differential, provided to ensure that generally equal amounts of torque are distributed to the front and rear drive axles and to accommodate any unequal amounts of rotation of the vehicle wheels (tires) with the road.

During hazardous driving conditions, many truck operators find it desirable to lock the differential between the two drive axles. Accordingly, many truck differentials provide an interaxle lock that torsionally locks the front and rear drive axles together.

The power train rearward of the engine/transmission is commonly called the tandem axle assembly. The tandem axle assembly has a front axle casing and a rear axle casing. The front axle casing mounts a ring gear. The ring gear mounts a differential carrier that powers the front drive half axles. The ring gear is rotated by a pinion gear mounted on a counter shaft. The counter shaft on its opposite end has a driven (sometimes referred to as a counter) spur or helical gear which is splined thereon.

The driven gear is rotated by a helical side gear. The helical side gear is rotatably mounted by a front or first input shaft that is torsionally connected with a transmission output shaft. The first input shaft is connected to a cross member (commonly referred to as a differential spider) upon which are bevel gears that mesh with the helical side gear. The spider is also in mesh with a second side gear which is torsionally connected with an axially aligned second shaft which is associated (by yoke) with an input shaft for the rear drive axle input shaft.

Torsionally fixed on but axially slidably mounted on the first input shaft is a sliding clutch gear. The sliding clutch gear can be moved by a shift fork to lock with the helical side gear thereby locking the helical side gear with the first axle input shaft and thereby locking the front and rear drive axles of the tractor axle assembly together. To move the clutch gear between its unlocked and locked position there is provided a shift fork.

Utilization of the shift fork has been satisfactory, however, the utilization of the shift fork requires more space within the front axle casing than what is desired and causes wear of the shift fork, especially attributable to its offset mounting. Additionally, force application on the clutch gear is more uneven than optimally desired. It is desirable to provide an improved interaxle differential lock which is superior to those available in the past and eliminate the utilization of the shift fork.

SUMMARY OF THE INVENTION

To make manifest the above noted desires a relevation of the present invention is brought forth. In a preferred embodiment, the present invention brings forth a differential for an axle assembly with an interaxle differential for a vehicle having at least first and second drive axles. The arrangement includes a casing and a ring gear rotatably mounted within the casing. A counter shaft with an input pinion is provided rotatably mounted within the casing. The counter shaft first end has the pinion which is meshed with the ring rear.

A driven gear is mounted on a second end of the counter shaft. The driven gear is meshed with the helical side gear. The helical side gear is rotatably mounted on a front or first axle input shaft adjacent a first or rear end thereof. A spider is connected on the rear end of the first axle input shaft having bevel gears meshed with the helical side gear. A second axle input shaft is axially aligned with the first axle input shaft. A second side gear is connected on the second axle input shaft and is in mesh with the spider. A clutch gear is torsionally locked on the first axle input shaft and is axially slidably mounted thereon for selective engagement with the helical side gear.

A fluid-actuated annular piston is provided which is mounted in the casing. The annular piston is provided to urge the clutch gear into engagement with the helical side gear that torsionally locks the first and second axle input shafts together. A spring is provided to urge the clutch gear to the unlocked position on the first axle input shaft.

It is a desire of the present invention to provide an arrangement of an axle assembly with an interaxle differential for a vehicle having first and second drive axles having an annular piston which urges a clutch gear into engagement with a helical side gear to lock first and second axle input shafts torsionally together.

Other features and desires of the present invention can be further realized from a review of the accompanying drawings and detailed description.

DETAILED DESCRIPTION OF THE EMBODIMENT

Figure 1:
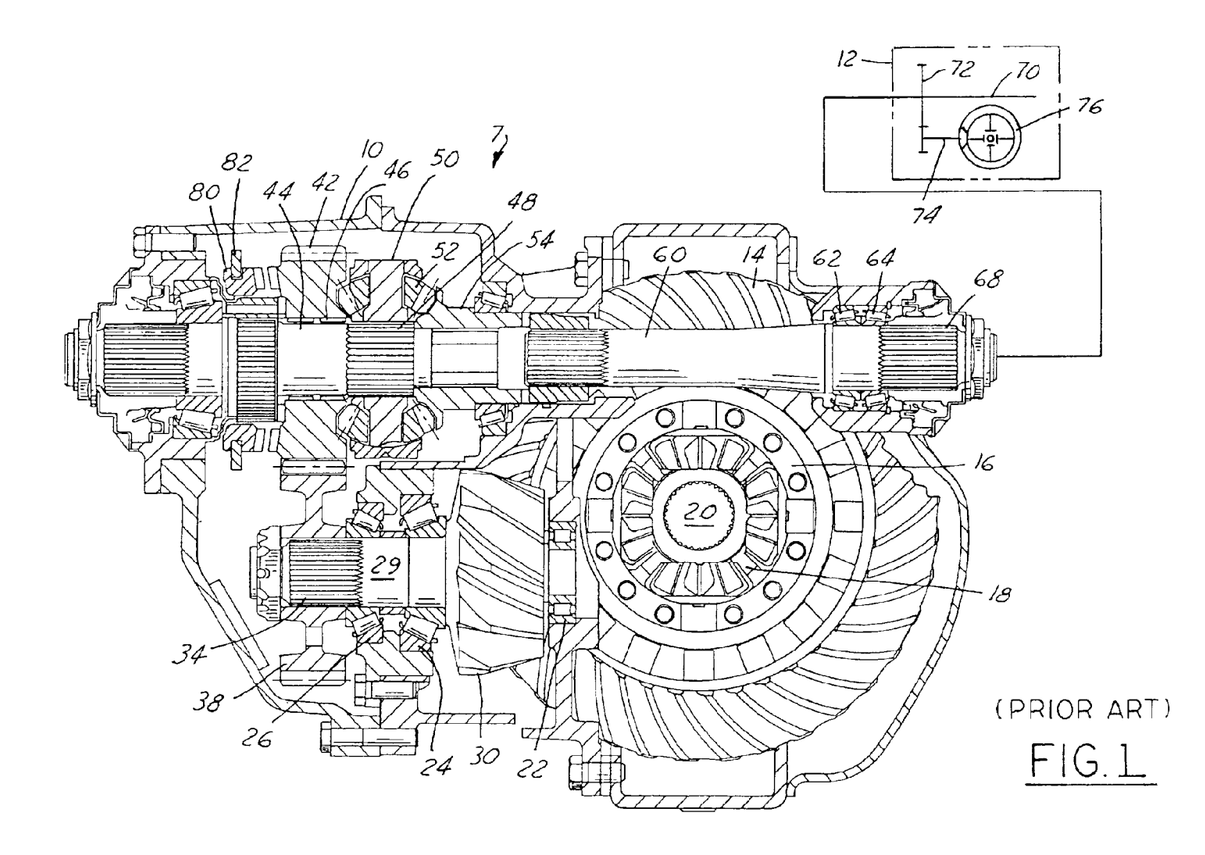
FIG. 1 is a view, mostly sectional, of a prior art arrangement of an axle assembly with an interaxle differential for a vehicle having at least first and second drive axles prior to the present invention.

Referring to FIG. 1 an arrangement 7 of an axle assembly with an interaxle differential for a vehicle having at least first and second drive axles is provided. The casing 10 for the front axle is shown in section and the casing for the rear axle 12 is shown schematically. The arrangement 7 has rotatably mounted therein for the front axle a ring gear 14. The ring gear 14 mounts a carrier 16. The carrier 16 along with side gears 18 (only one shown) forms a front axle differential for the half shafts (only one shown) 20 of the front axle. Rotatably mounted in the casing 10 by a front end bearing 22 and tapered thrust bearings 24, 26 is a counter shaft 29 with a pinion gear 30 along its end. The pinion gear 30 is meshed with the ring gear 14. On a second opposite end 34 of the counter shaft there is mounted by a splined connection driven gear 38. The driven gear 38 is meshed with a side gear 42. The example shown is a helical gear; however, gear 42 can be a spur or other parallel gear. The side gear 42 is rotatably mounted on a first or front axle input shaft 44 by a bearing 46. The side gear 42 is mounted adjacent a front end 48 of the front axle input shaft 44.

A spider 50 has a splined connection with the rear extreme end of the first axle input shaft 44. The spider 50 has bevel pinions 52 which are in a mesh relationship with the side gear 42. The bevel pinions 52 are also meshed with a rear bevel side gear 54. The side gear 54 is torsionally locked onto the second or rear axle input shaft 60. The second axle input shaft (sometimes referred to as the output shaft) 60 is mounted in its rear end in the casing 10 by thrust bearings 62, 64. A rear end 68 of the second axle input shaft 60 is connected via a yoke and a universal joint connected drive shaft (not shown) with a shaft 70 having a gear 72 which is in turn meshed with a pinion 74 which turns a ring gear 76 which drives the rear axle halves in a manner similar to that previously described for the front ring gear 14 and the front half shafts 20.

Axially slidably mounted on the front axle input shaft 44 is a sliding dog clutch gear 80. The clutch gear 80 is axially positioned on the front axle input shaft 44 by a fork 82. A mechanism (not shown) is provided for moving the fork while retaining the fork in a desired axial position with respect to the front axle input shaft 44. When it is desired to lock the front axle input shaft 44 with the rear axle input shaft 60, the fork 82 moves the clutch gear 80 rearward to lock in position with the side gear 42. The locking of the clutch gear 80 with the side gear 42 causes the clutch gear 80, side gear 42, spider 50, side gear 54 and rear axle output shaft 60 to rotate in unison and effectively eliminate the differential which typically exists between the front axle input shaft 44 and the rear axle output shaft 60.

Figure 2:
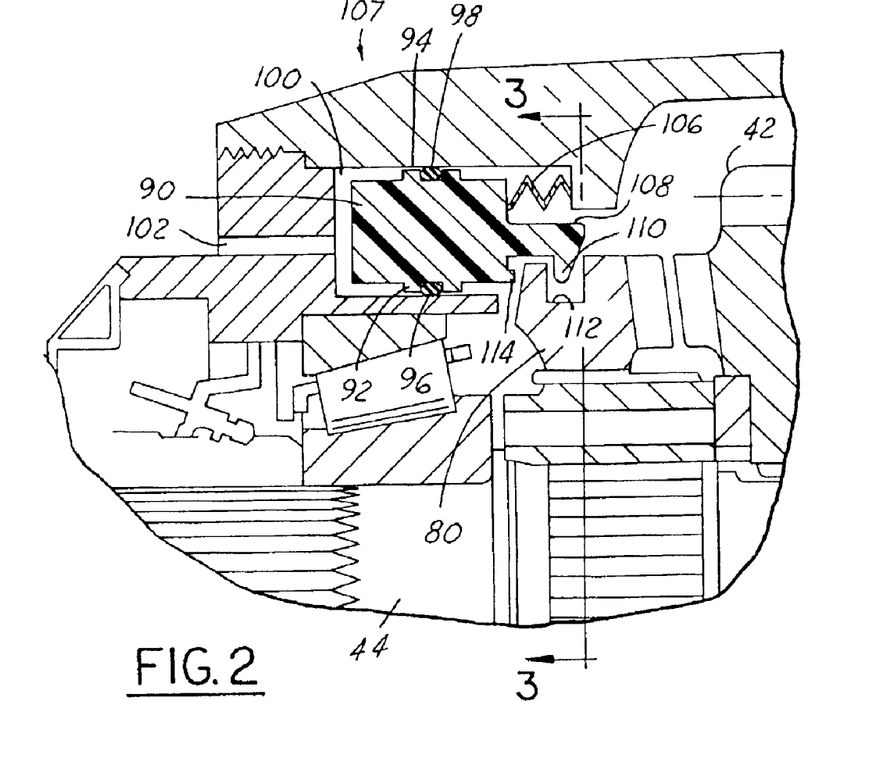
FIG. 2 is a partial sectional view of a preferred embodiment arrangement of an axle assembly with an interaxle differential for a vehicle having at least first and second drive axles according to the present invention.
Figure 3:
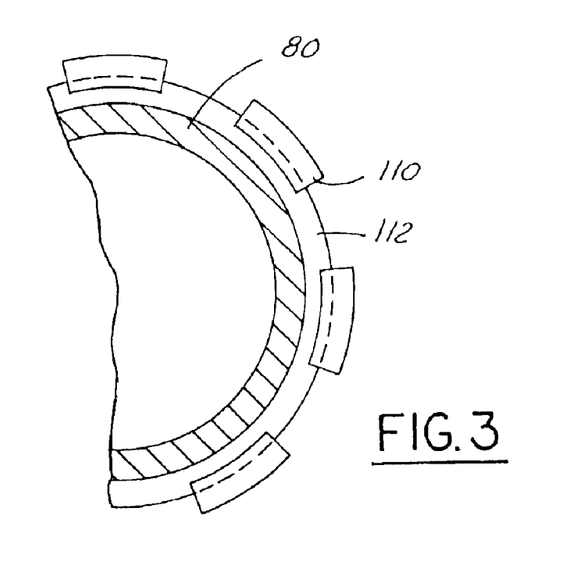
FIG. 3 is a view taking along lines 3—3 of FIG. 2.

Referring to FIGS. 2–3, an arrangement 107 of the present invention is provided. Items performing similar functions as those previously described will be given identical reference numerals. In the arrangement 107, front axle input shaft 44 has axially slidably mounted thereon a clutch gear 80. Replacing the fork 82 is a fluid-actuated annular piston 90. The piston 90 can be provided by various types of wear-resistant materials such as brass or a fiber-reinforced polymeric material such as glass reinforced plastic. The piston 90 has inter diameter studs 92, 94 which provide ring seats for sealing rings 96, 98 respectively. The sealing rings 96, 98 seal an annular chamber 100 that can be hydraulically or preferably pneumatically fed via a line 102.

A bevel spring 104 juxtaposed between a leg 106 of the casing and the piston 90 biases the piston 90 to its forward-most position. The piston 90 also has a series of geometrically spaced forward extending fingers 108 having a hook 110 which extend into a fork groove 112 of the clutch gear 80. To engage the clutch gear 80 with the side gear 42, the chamber 100 is pressurized and the piston 90 is actuated rearward causing a contact portion 114 to push the clutch gear 80 into engagement with the side gear 42. Upon depressurization of the chamber 100, the piston 90 will be pushed back by the bevel spring(s) 104 causing the hook 110 captured within the fork groove 112 to pull the clutch gear 80 out of engagement with the clutch groove. Typically the piston will be flexible enough so that upon initial assembly the hooks 110 will be forward of a forward end of the clutch gear and pressurization of the chamber 100 will cause the hook and fingers 108 to flex upwards and then snap down into position.

Figure 4:
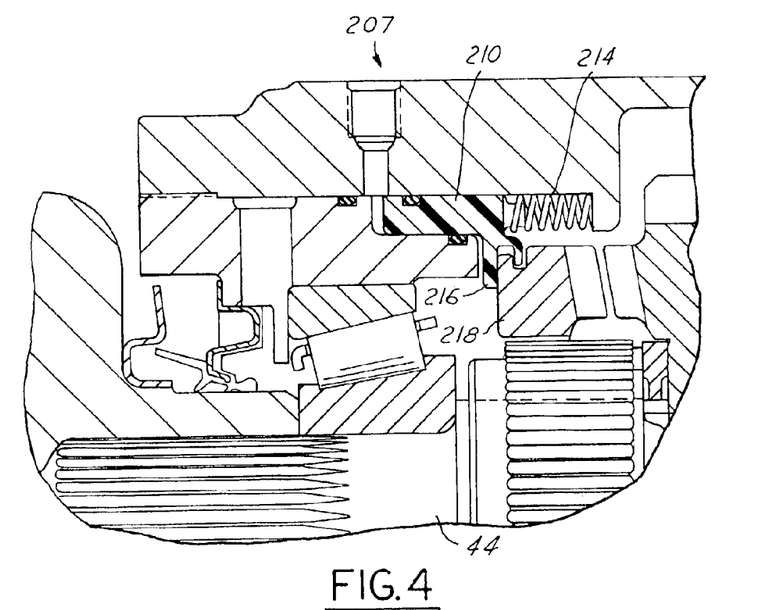
FIG. 4 is a view similar to that of FIG. 2 of an alternate preferred embodiment arrangement of an axle assembly with an interaxle differential for a vehicle having at least first and second drive axles.

Referring to FIG. 4, an interaxle differential arrangement 207 is provided having a front axle input shaft 44. The interaxle differential arrangement 207 has a clutch gear 218 similar to that as previously described. An annular piston 210 is provided which is biased to its forward position by a series of geometrically and equally spaced coil springs 214. The piston 210 has an inwardly extending arm 216 which abuts a forward face of the clutch gear 218.

Figure 5:
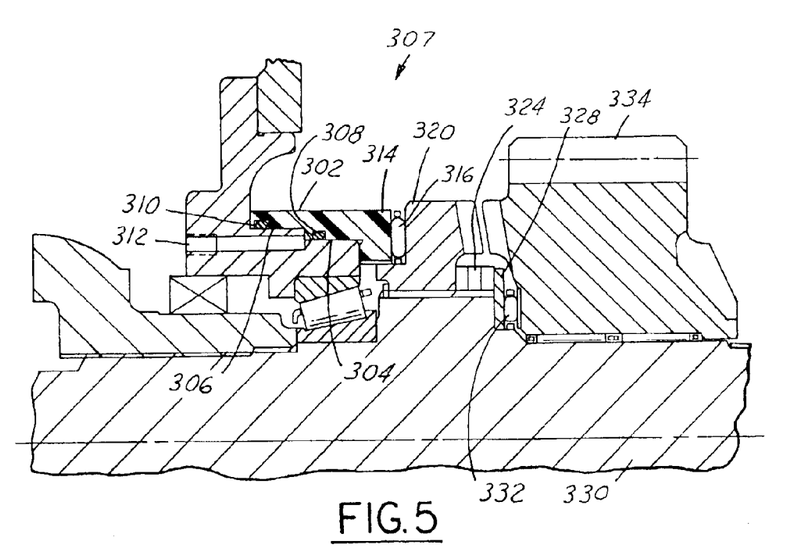
FIG. 5 is a sectional view similar to that of FIGS. 2 and 4 of another alternate preferred embodiment interaxle differential according to the present invention.

Referring to FIG. 5, an arrangement 307 interaxle differential is provided. The interaxle differential 307 has a piston 302. The piston 302 has multiple inter diameters 304, 306 which are sealed by O-rings 308, 310 respectively, that seal the expansion chamber upon pressurization of the same via a line 312. The piston 302 has a head 314 which abuts a needle bearing 316 which is juxtaposed between the piston 302 and the clutch gear 320. The clutch gear is spring biased forward to its non-actuated position by a wave spring 324. The wave spring 324 is juxtaposed between a plate 328 which is mounted on a first axle input shaft 330 and the clutch gear 320. A needle bearing 332 is juxtaposed between the plate 328 and a side gear 334.

Figure 6:
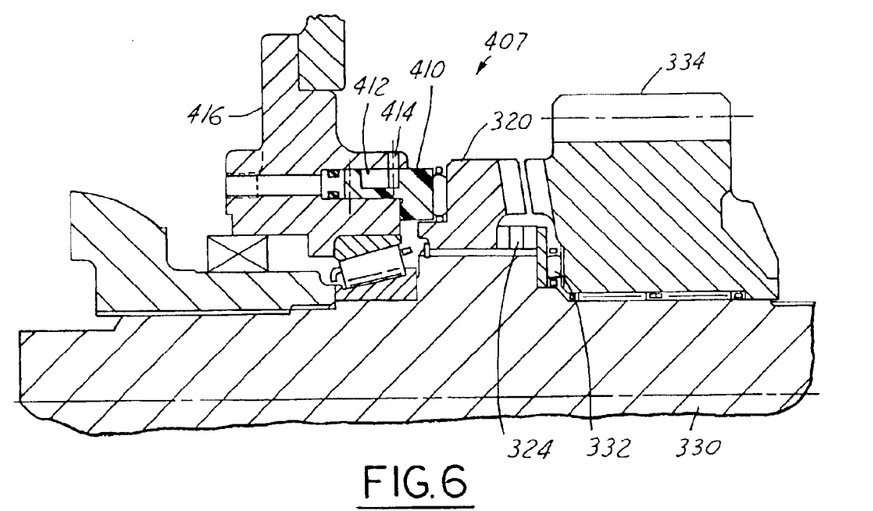
FIG. 6 is a sectional view similar to that of FIG. 5 of still another alternate preferred embodiment interaxle differential according to the present invention.

Referring to FIG. 6, an interaxle differential arrangement 407 is provided with items common to the arrangement 307 being given like reference numerals. In arrangement 407, a piston 410 is provided having a longitudinal non-angular slot 412. A pin 414 is projected through an aperture in the casing 416 having its lower end projecting into the slot 412 to provide a pin and slot anti-rotational arrangement. The pin and slot arrangement between the pin held within the casing 416 and also within the slot 412 prevents rotation of the piston 410.

Figure 7:
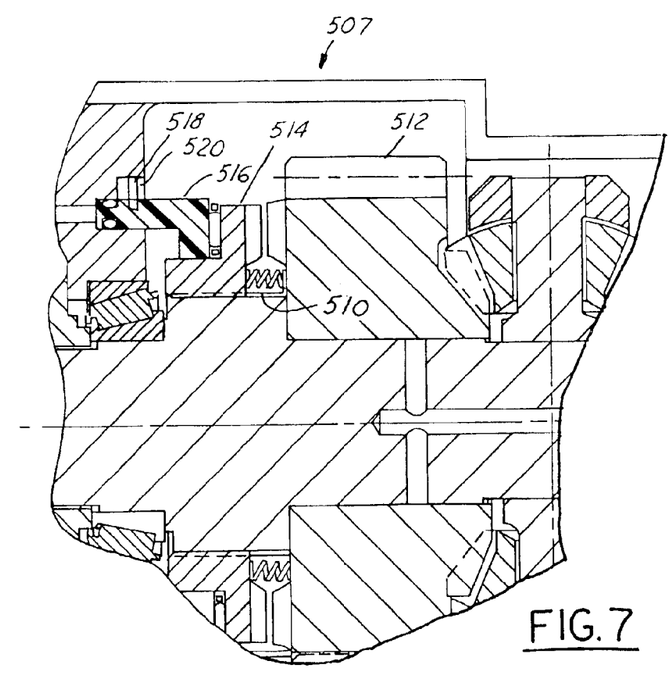
FIG. 7 is a sectional view similar to that of FIG. 6 of still another alternate preferred embodiment interaxle differential according to the present invention.
Figure 8:
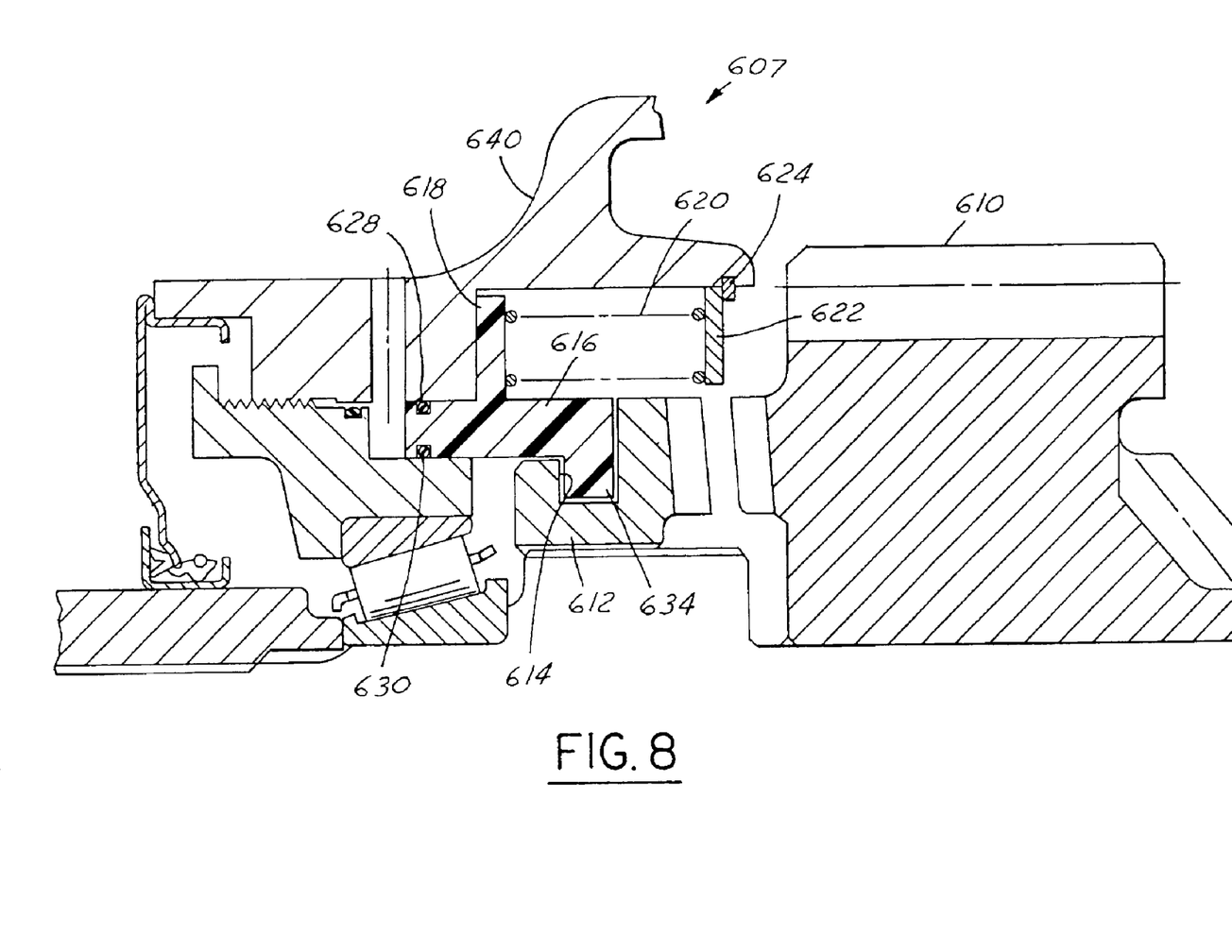
FIG. 8 is a sectional view similar to that of FIG. 7 of still another alternate preferred embodiment interaxle differential according to the present invention.
Figure 9:
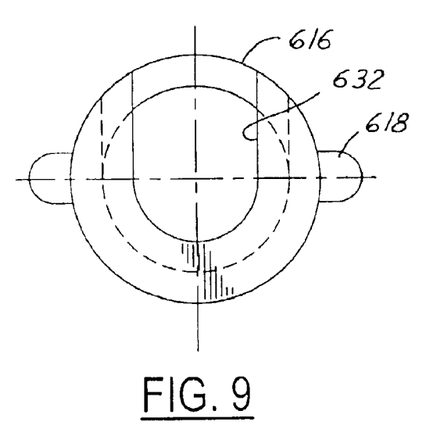
FIG. 9 is a plan elevational view of the piston of the interaxle differential show in FIG. 8.
Figure 10:
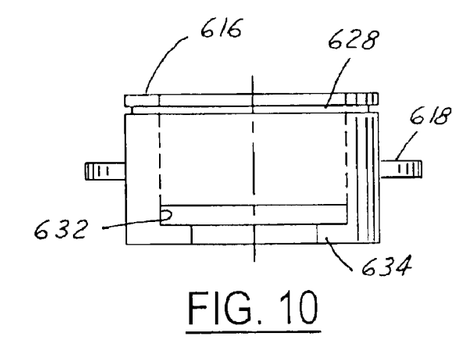
FIG. 10 is a side elevational view of the piston shown in FIG. 9.
Figure 11:
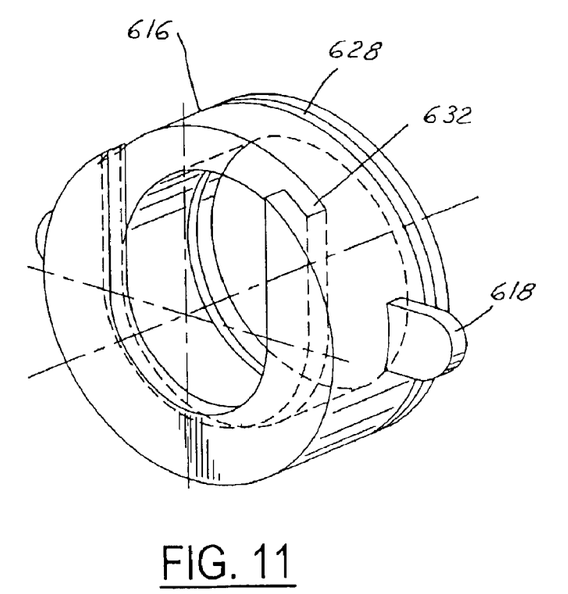
FIG. 11 is an enlarged perspective view of the piston shown in FIGS. 9 and 10.

Referring to FIG. 7, an interaxle differential arrangement 507 is provided. The interaxle differential arrangement 507 has components generally similar to those described in arrangements 307 and 407. Bevel springs 510 are juxtaposed between a side gear 512 and a clutch gear 514 to bias the clutch gear 514 in a more forward position. A piston 516 is provided having an imbedded pin 518. The imbedded pin 518 travels in a longitudinal slot 520 provided in the casing. The combination of pin 518 and slot 520 provide a pin and slot combination preventing the piston 516 from rotation.

Referring to FIGS. 8–11, an interaxle differential arrangement 607 is provided. The interaxle differential 607 has a helical side gear 610 in a sliding clutch gear 612. The sliding clutch gear has an annual groove 614. Interlocked with the sliding clutch gear 612 is a radially slotted piston 616. The piston 616 has two radially projecting ears 618 to allow it to be contacted by a spring 620. The spring 620 is captured between the piston ear 618 and an annular washer 622 which is held in position by a retaining ring 624. The piston 616 has an outer sealing ring 628 and an inter sealing ring 630, having ring seals inserted therein. The piston 616 also has a radial slot 632 which is enclosed by a flange 634. The flange portion 634 is interlocked within the groove 614 of the piston. This allows the piston 616 and the sliding clutch gear 612 to be pushed back by the spring 620 as if they were one common member. The casing 640 has a pocket (not shown) for nesting the ears 618 to prevent the piston 616 from rotating.

While the invention has been described in connection with specific embodiments thereof, it is evident that many alternatives, modifications and variations will be apparent to those skilled in the art in light of the foregoing description. Accordingly, it is intended to embrace all such alternatives, modifications and variations that fall within the spirit and broad scope of the appended claims.

What is claimed is:

1. An arrangement of an axle assembly with interaxle differential for a vehicle having at least first and second drive axles comprising:

a casing;

a ring gear rotatively mounted in said casing;

a counter shaft with a first pinion geared end meshed with said ring gear;

a driven gear mounted on a second end of said counter shaft;

a first side gear, meshed with said driven gear;

a first axle input shaft rotatively mounting said first side gear adjacent a first end of said first axle input shaft;

a spider connected with said first end of said first axle input shaft having gears meshed with said first side gear;

a second axle input shaft axially aligned with said first axle input shaft;

a second side gear connected on said second axle input shaft and in mesh with said gears of said spider;

a clutch gear torsionally locked on said first axle input shaft and axially slidably mounted thereon for selective engagement with said first side gear;

a fluid activated annular piston mounted in said casing and concentric with a center line of said clutch gear for urging said clutch gear into engagement with said first side gear to torsionally lock said first and second input shafts together, at least a portion of said piston axially aligned with said clutch gear along an axis extending parallel to an axis of rotation of said first axle input shaft; and a spring to urge said clutch gear to an unlocked position on said first input shaft.

2. An arrangement as described in claim 1, wherein said piston is pneumatically actuated.

3. An arrangement as described in claim 1, wherein said piston is hydraulically actuated.

4. An arrangement as described in claim 1, wherein said piston is fabricated from brass.

5. An arrangement as described in claim 1, wherein said spring is juxtaposed between said casing and said piston.

6. An arrangement as described in claim 1, wherein said spring is a wave spring.

7. An arrangement as described in claim 1, wherein said spring is a bevel spring.

8. An arrangement as described in claim 1, wherein said spring is a coil spring.

9. An arrangement as described in claim 1, wherein said piston has fingers to snap in a groove provided in said clutch gear.

10. An arrangement as described in claim 1, further including a bearing between said piston and said clutch gear.

11. An arrangement as described in claim 1, wherein said piston has multiple diameters and said piston seals an expansion chamber along two inter diameter seals.

12. An arrangement as described in claim 1, wherein said piston is made from a polymeric material.

13. An arrangement as described in claim 12, wherein said piston has fiber reinforcements.

14. An arrangement as described in claim 1, wherein said piston has an anti-rotation device preventing said piston rotating with respect to said casing.

15. An arrangement as described in claim 14, wherein said anti-rotation device includes a pin and slot arrangement between said piston and said casing.

16. An arrangement as described in claim 1, wherein said spring is juxtaposed between said clutch gear and said first side gear.

17. An arrangement as described in claim 16, further including a bearing between said first axle input shaft and said first side gear.

18. An arrangement of an axle assembly with interaxle differential for a vehicle having at least first and second drive axles comprising:

a casing;

a ring gear rotatively mounted in said casing;

a counter shaft with a first pinion geared end meshed with said ring gear;

a driven gear mounted on a second end of said counter shaft;

a side gear meshed with said driven gear;

a first axle input shaft rotatively mounting said first side gear adjacent a first end of said first axle input shaft;

a spider connected with said first end of said first axle input shaft having gears meshed with said first side gear;

a second axle input shaft axially aligned with said first axle input shaft;

a second side gear connected on said second axle input shaft and in mesh with said gears of said spider;

a clutch gear torsionally locked on said first axle input shaft and axially slidably mounted thereon for selective engagement with said first side gear;

a fluid activated annular piston mounted in said casing for urging said clutch gear into engagement with said first side gear to torsionally lock said first and second input shafts together; and a spring to urge said clutch gear to an unlocked position on said first input shaft wherein said clutch gear has a groove and wherein said piston has a radial slot which is flanged and wherein said piston and said clutch gear are interlocked with each other.

19. An arrangement of an axle assembly with an interaxle differential for a vehicle having at least first and second drive axles comprising:

a casing;

a ring gear rotatively mounted in said casing;

a counter shaft with a first pinion geared end meshed with said ring gear;

an driven gear mounted on a second end of said counter shaft;

a first side gear meshed with said driven gear;

a first axle input shaft rotatively mounting said first side gear adjacent a first end of said first axle input shaft;

a spider connected with said first end of said first axle input shaft having gears meshed with said first side gear;

a second axle input shaft axially aligned with said first axle input shaft;

a second side gear connected on said second axle input shaft and meshed with said gears of said spider;

a clutch gear torsionally locked on said first axle input shaft and axially slidably mounted thereon for selective engagement with said first side gear, said clutch gear having a groove;

a fluid-actuated annular piston mounted in said casing and concentric with a center line of said clutch gear for urging said clutch gear into engagement with said first side gear to torsionally lock said first and second axle input shafts together, said piston having a radial slot which is flanged to interlock with said clutch gear, at least a portion of said piston axially aligned with said clutch gear along an axis extending parallel to an axis of rotation of said first axle input shaft; and a spring to urge said piston and said clutch gear to an unlocked position on said first axle input shaft.

20. An arrangement of an axle assembly with an interaxle differential for a vehicle having at least first and second drive axles comprising:

a casing;

a ring gear rotatively mounted in said casing;

a counter shaft with a first pinion geared end meshed with said ring gear;

an driven gear mounted on a second end of said counter shaft;

a first side gear meshed with said driven gear;

a first axle input shaft rotatively mounting said first side gear adjacent a first end of said first axle input shaft;

a spider connected with a said first end of said first axle input shaft having gears meshed with said first side gear;

a second axle input shaft axially aligned with said first axle input shaft;

a second side gear connected on said second axle input shaft and meshed with said gears on said spider;

a clutch gear torsionally locked on said first axle input shaft and axially slidably mounted thereon for selective engagement with said first side gear;

a fluid-actuated annular piston mounted in said casing and concentric with a center line of said clutch gear for urging said clutch gear into engagement with said first side gear to torsionally lock said first and second axle input shafts together, said piston having an anti-rotation arrangement with said casing preventing rotation of said piston, at least a portion of said piston axially aligned with said clutch gear along an axis extending parallel to an axis of rotation of said first axle input shaft; and a spring juxtaposed between said clutch gear and said first side gear to urge said clutch gear to an unlocked position on said first axle input shaft.

* * * * *